No. 750,959. PATENTED FEB. 2, 1904.
G. F. FREED.
PIPE FORCING JACK.
APPLICATION FILED JUNE 27, 1903.
NO MODEL.
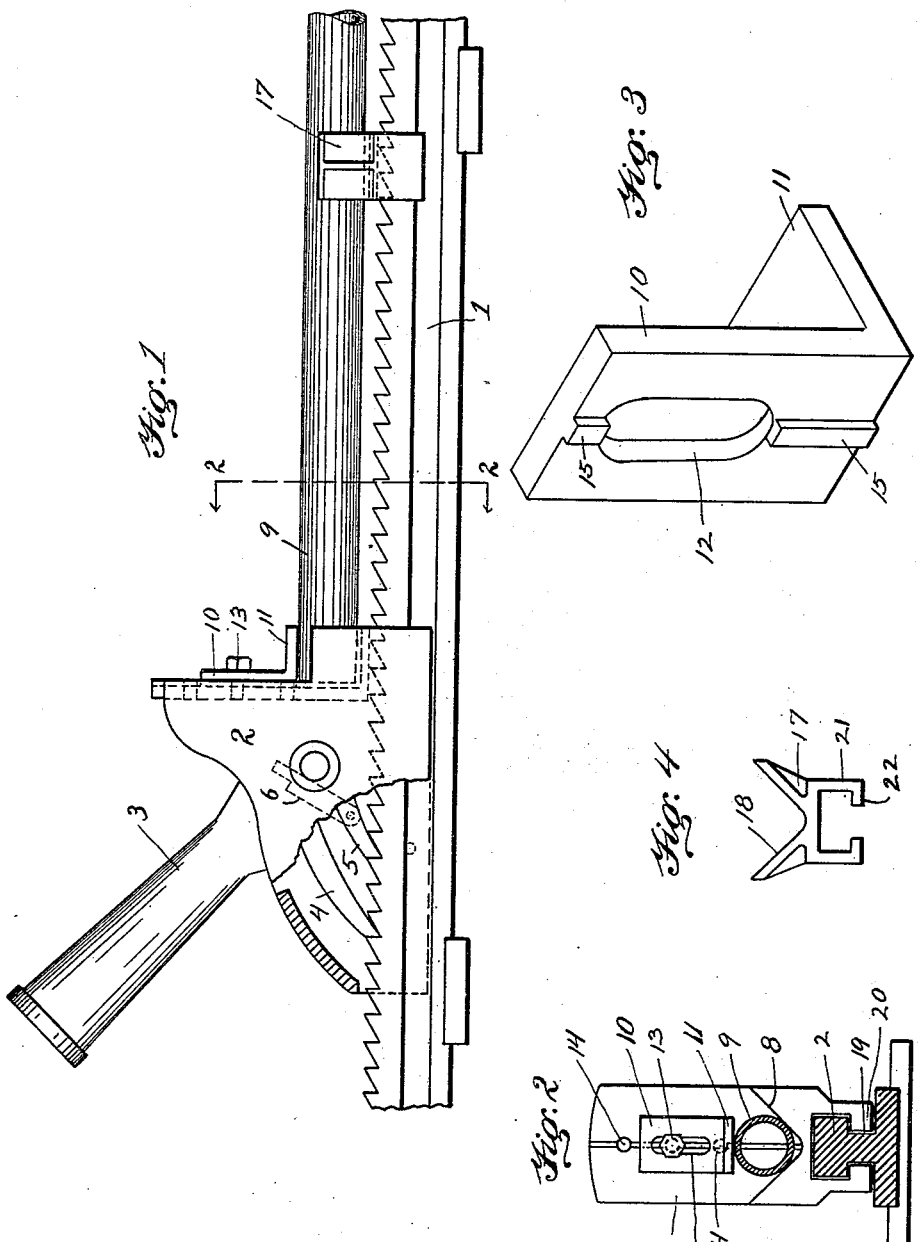
Witnesses.
Robert C Totten
H. G. Dieterich
Inventor.
George F Freed
By Totten & Winter
Attorneys.

No. 750,959. Patented February 2, 1904.

UNITED STATES PATENT OFFICE.

GEORGE F. FREED, OF ALLEGHENY, PENNSYLVANIA, ASSIGNOR TO THE DUFF MANUFACTURING COMPANY, OF ALLEGHENY, PENNSYLVANIA, A CORPORATION OF PENNSYLVANIA.

PIPE-FORCING JACK.

SPECIFICATION forming part of Letters Patent No. 750,959, dated February 2, 1904.

Application filed June 27, 1903. Serial No. 163,318. (No model.)

*To all whom it may concern:*

Be it known that I, GEORGE F. FREED, a resident of Allegheny, in the county of Allegheny and State of Pennsylvania, have invented a new and useful Improvement in Pipe-Forcing Jacks; and I do hereby declare the following to be a full, clear, and exact description thereof.

My invention relates to mechanism for forcing pipes, rods, or other articles; and its obtect is to adapt ordinary jacking mechanism for this purpose.

In many relations it is necessary to force a pipe, rod, or the like into or through some other object, one instance of this being found in the laying of small-sized pipe-lines in sandy soil where it is the common practice to force the pipe endwise through the soil instead of digging a trench therefor. This requires much power.

The object of my invention is to adapt ordinary jacking mechanism to this and similar purposes; and to this end the invention comprises, generally stated, a horizontal stationary rack-bar and a jack frame or cage movable thereon and provided with actuating mechanism for moving the same along the rack-bar, the said cage or frame being provided with a suitable socket or seat for engaging the end of the pipe or other object to be forced, so that the latter may be pushed along with the cage or frame.

The invention also comprises certain brackets or guides on the rack-bar for supporting and guiding the tube or other article being forced, as well as holding means to prevent the end of the pipe from jumping out of the seat in the cage or frame.

In the accompanying drawings, Figure 1 is a side view of the jack, partly in section. Fig. 2 is a vertical section on the line 2 2, Fig. 1. Fig. 3 is a perspective view of the clamp or bracket for holding the pipe end in its seat, and Fig. 4 is an end view of the guiding-bracket.

My mechanism requires a suitable stationary rack-bar 1, a jack frame or cage 2, and suitable operating mechanism for moving the latter along the rack-bar. This operating mechanism may be of any known form or description, that shown comprising the operating-lever 3 and pawls 4 and 5, together with a tripping-latch 6 for disengaging the pawls from the ratchet-bar, this being one well-known type of jack. The invention, however, is not limited to this form of jack, as any other type of jack will answer my purpose equally as well. In use the rack-bar 1 is held stationary by any suitable means, and the frame or cage 2 is made to travel along the same. The frame or cage is provided at its forward end with a suitable seat 8 for receiving the end of the pipe or other article 9 to be forced. The seat 8 is preferably V-shaped, as shown, so that it can readily accommodate pipes or rods of different diameters, and in order to prevent the end of the latter from lifting out of said seat I secure to the cage above the same a clamp 10, having a foot 11, which rests upon the tube or rod and holds the same down in the seat. This clamp may be secured to the cage in any suitable way, such as by the bolt 13, and in order to adapt it to different-sized pipes the hole through said clamp is elongated, as at 12, and also a number of holes 14 are formed in the cage, so that the bolt 13 can be placed at different heights. A suitable tongue-and-groove connection 15 is formed between the clamp and cage, so that said clamp will always be maintained in a perpendicular position.

In connection with the above I employ suitable brackets or guides for supporting and guiding the tube, one such bracket being shown in the drawings at 17. This is mounted on the rack-bar 2 and is provided with a suitably-formed upper face, such as the V-face 18, for supporting and guiding the pipe. This bracket can be secured to the rack-bar in any suitable way. Usually the rack-bar is provided on each side with a groove 19 for receiving inwardly-projecting ribs 20 on the cage to prevent the latter from rising from said bar. These grooves provide a convenient means for the attachment of the brackets 17 to the rack-bar, and accordingly said brackets are provided with downwardly-projecting arms 21, having inturned ends 22, which engage the grooves 19 in the rack-bar, thus holding said brackets on said rack-bar, but permitting them to be moved longitudinally thereof.

By means of my jack pipes or other articles may be forced endwise with ease and facility, the jack operating in the usual way of jacks to give a slow step-by-step movement to the article being forced. The construction is simple and efficient, providing means to securely hold the end of the pipe or other article being forced and also means for properly guiding the same.

What I claim as my invention, and desire to secure by Letters Patent, is—

1. In mechanism for forcing pipes or rods endwise, the combination with a stationary rack-bar, of a frame arranged to move along the same, actuating mechanism in said frame or cage, and means on the forward end of said frame constructed to receive the end of the article being forced and hold the same against lateral movement.

2. In mechanism for forcing pipes or rods endwise, the combination with a stationary rack-bar, of a frame or cage arranged to move along the same, actuating mechanism in said frame or cage, and a forwardly-opening seat or socket on the forward end of said frame and serving to receive the end of the article being forced and hold the same against lateral movement.

3. In forcing mechanism, the combination with a stationary rack-bar, of a frame or cage arranged to move along the same, actuating mechanism in said frame or cage, a V-shaped seat on the forward end of said frame serving as a bearing for the end of the article being forced, and a clamp secured to the frame above said seat.

4. In forcing mechanism, the combination with a stationary rack-bar, of a frame or cage arranged to move along the same, actuating mechanism in said frame or cage, a seat on the forward end of said frame serving as a bearing for the end of the article being forced, and a bracket having a slot-and-groove connection with said frame and secured thereto so as to be vertically adjustable.

5. In forcing mechanism, the combination with a stationary rack-bar, of a frame or cage arranged to move along the same, actuating mechanism for said frame or cage, a seat or socket on the forward end of said frame serving as a bearing for the end of the article being forced, and a guiding and supporting bracket on the rack-bar.

6. In forcing mechanism, the combination with a stationary rack-bar provided with grooves in its side, a frame or cage arranged to move along the same and provided with ribs engaging said grooves, actuating mechanism in said frame, a seat or socket on the forward end of said frame, and a guiding and supporting bracket provided with arms engaging the grooves in the rack-bar.

In testimony whereof I, the said GEORGE F. FREED, have hereunto set my hand.

GEORGE F. FREED.

Witnesses:
ROBERT C. TOTTEN,
F. W. WINTER.